United States Patent
Mizouchi et al.

(10) Patent No.: US 7,887,189 B2
(45) Date of Patent: Feb. 15, 2011

(54) PROJECTION TYPE DISPLAY APPARATUS WHICH DETECTS LIGHT EMITTED FROM A FACE OF A BEAM SPLITTER AND METHOD THEREOF

(75) Inventors: Satoru Mizouchi, Kanagawa (JP); Junichi Iwai, Kanagawa (JP)

(73) Assignee: Sony Corporation (JP)

( * ) Notice: Subject to any disclaimer, the term of this patent is extended or adjusted under 35 U.S.C. 154(b) by 647 days.

(21) Appl. No.: 11/982,907

(22) Filed: Nov. 6, 2007

(65) Prior Publication Data
US 2008/0117386 A1 May 22, 2008

(30) Foreign Application Priority Data
Nov. 20, 2006 (JP) ............... P2006-313184

(51) Int. Cl.
G03B 21/14 (2006.01)
(52) U.S. Cl. .......................... 353/20; 353/34
(58) Field of Classification Search ............ 353/20, 353/30–34, 85
See application file for complete search history.

(56) References Cited

U.S. PATENT DOCUMENTS 5,477,280 A * 12/1995 Ko ............................ 348/744
6,587,214 B1 * 7/2003 Munks ........................ 356/519
6,808,270 B2 * 10/2004 Nelson et al. ................. 353/69
2007/0195288 A1 * 8/2007 Ahn ............................ 353/97

FOREIGN PATENT DOCUMENTS

| JP | 3-132787 A | 6/1991 |
| JP | 2001-281761 A | 10/2001 |
| JP | 2005-250249 A | 9/2005 |

* cited by examiner

Primary Examiner—Thanh X Luu
(74) Attorney, Agent, or Firm—Lerner, David, Littenberg, Krumholz & Mentlik, LLP (57) ABSTRACT

Disclosed herein is a projection type display apparatus, including: a color separation optical system configured to separate light from a light source into a plurality of light fluxes of different colors; a plurality of reflection type light valve devices provided individually for the color light fluxes; a plurality of polarization beam splitters each configured to polarize and separate a predetermined one of the color light fluxes separated by said color separation optical system and then polarize and separate the light coming in from the reflection type light valve device; and a light reception device provided for one or more of said polarization beam splitters and configured to detect light emitted from a second face from among faces of the predetermined polarization beam splitter which is opposite to a first face to which the predetermined color light flux from said color separation optical system is introduced.

7 Claims, 6 Drawing Sheets

PROJECTION TYPE DISPLAY APPARATUS WHICH DETECTS LIGHT EMITTED FROM A FACE OF A BEAM SPLITTER AND METHOD THEREOF

CROSS REFERENCES TO RELATED APPLICATIONS

The present application claims priority from Japanese Patent Application No. JP 2006-313184 filed in the Japanese Patent Office on Nov. 20, 2006, the entire content of which is incorporated herein by reference.

BACKGROUND OF THE INVENTION

1. Field of the Invention

This invention relates to a projection type display apparatus, and more particularly to positional adjustment of parts of a projection type display apparatus.

2. Description of the Related Art

A projection type display apparatus which uses a reflection type light valve device is known as one of existing projection type display apparatus. One of such projection type display apparatus is disclosed, for example, in Japanese Patent Laid-Open No. 2005-250249.

Figure 1:
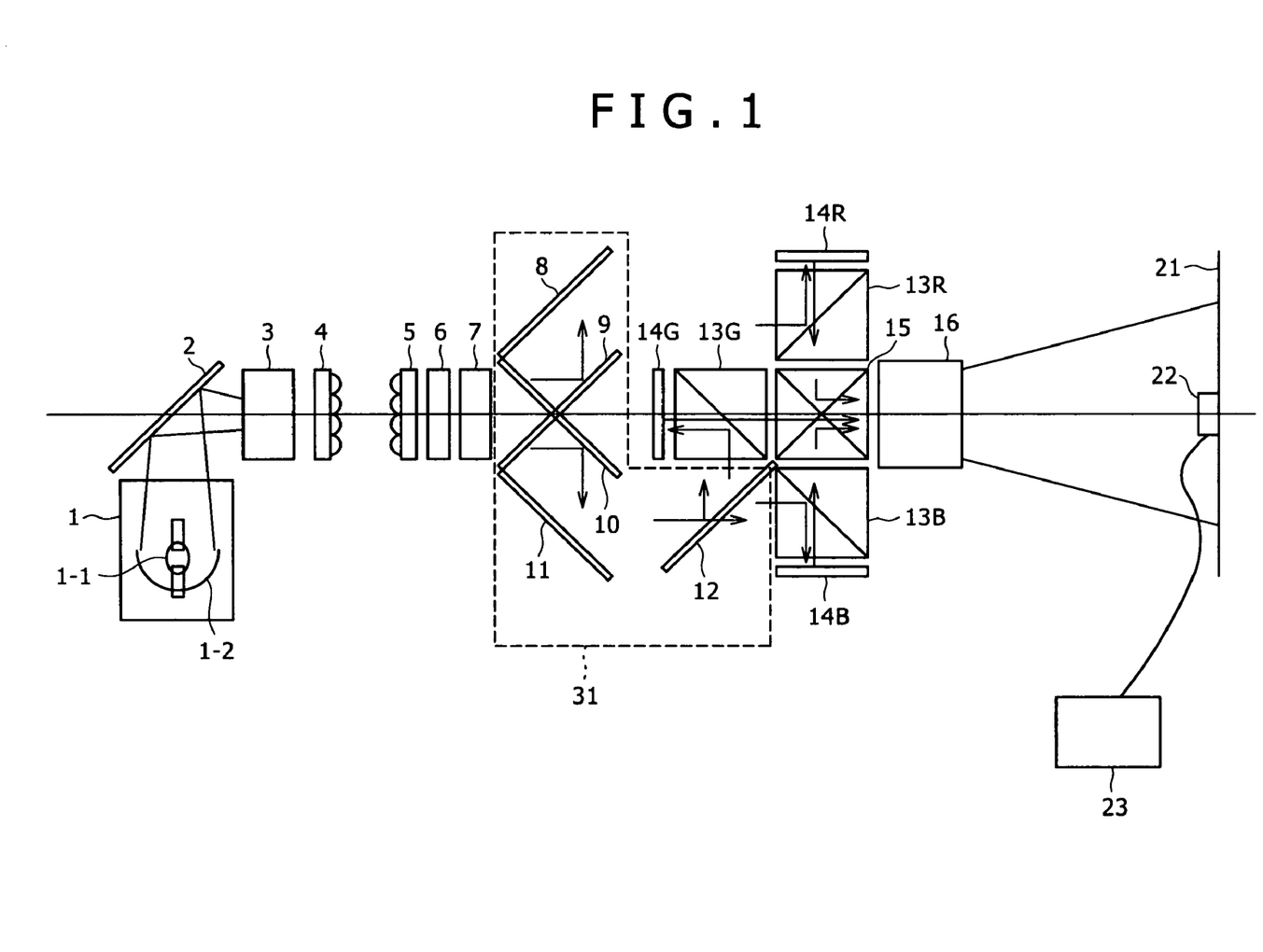
FIG. 1 is a schematic view showing an example of a general configuration of an existing projection type display apparatus.

FIG. 1 of the accompanying drawings shows an example of a general configuration of such an existing projection type display apparatus as mentioned above.

Referring to FIG. 1, the existing projection type display apparatus shown includes various components denoted by reference numerals 1 to 16 from a lamp house 1 to a projection lens 16. The projection type display apparatus emits a flux of light from the projection lens 16 to a screen 21 so that an image of the light flux is projected on the screen 21. In other words, a projected image is displayed on the screen 21.

The lamp house 1 includes a lamp bulb 1-1 serving as a light source, and a light condensing mirror 1-2 for condensing light emitted from the lamp bulb 1-1 and emitting the condensed light toward a desired direction.

The lamp bulb 1-1 is formed from a light source for radiating a flux of light over a wide frequency range such as a xenon short arc lamp or an ultra-high pressure lamp.

The flux of light emitted from the lamp house 1 is reflected by a mirror 2 and enters an optical system 3, by which it is shaped into a desired light flux. Then, the light flux passes through a first fly-eye device 4, a second fly-eye device 5, and a polarization control optical system 6 which shapes the light flux into a desired polarizing direction, and enters a color separation optical system 31 through an optical system 7.

A color separating system is provided in the color separation optical system 31 and includes dichroic mirrors 9 and 10 disposed in X-shaped arrangement. For example, in the example shown in FIG. 1, the dichroic mirror 9 reflects red wavelength light (hereinafter referred to as R light) while the dichroic mirror 10 reflects blue wavelength light (hereinafter referred to as B light) and green wavelength light (hereinafter referred to as G light). A pair of mirrors 8 and 11 is disposed so as to change the direction of the light flux passing through the color separating system. The color separation optical system 31 further includes a dichroic mirror 12 for reflecting the G light but transmitting the B light therethrough.

In particular, the R light reflected by the dichroic mirror 9 from within the light flux incoming to the color separation optical system 31 is introduced into a polarization beam splitter 13R after its direction is changed by the mirror 8. Meanwhile, the G light and the B light reflected by the dichroic mirror 10 are reflected by the mirror 11 to change their direction, and the G light is reflected by the dichroic mirror 12 and introduced into a polarization beam splitter 13G while the B light passes through the dichroic mirror 12 and is introduced into a polarization beam splitter 13B.

The R light incoming to the polarization beam splitter 13R is reflected by a polarizing film (hereinafter referred to suitably as polarizing separation portion) of the polarization beam splitter 13R and comes to a reflection type light valve device 14R. The reflection type light valve device 14R can control the state of the R light such that it arbitrarily adjusts the polarization state of the incoming R light for each very small region so that the R light passes through the polarizing separation portion of the polarization beam splitter 13R and introduced to a color synthesizing prism 15. In other words, the R light introduced from the polarization beam splitter 13R to the reflection type light valve device 14R is reflected by the reflection type light valve device 14R and introduced back into the polarization beam splitter 13R, whereafter it passes through the polarizing separation portion and then is introduced to the color synthesizing prism 15.

Similarly, the G light introduced from the polarization beam splitter 13G into a reflection type light valve device 14G is reflected by the reflection type light valve device 14G and then introduced back into the polarization beam splitter 13G, whereafter it passes through the polarizing separation portion and is introduced to the color synthesizing prism 15. Meanwhile, the B light introduced from the polarization beam splitter 13B into a reflection type light valve device 14B is reflected by the reflection type light valve device 14B and introduced back into the polarization beam splitter 13B, and then passes through the polarizing separation portion of the polarization beam splitter 13B and is introduced to the color synthesizing prism 15.

The color synthesizing prism 15 reflects the R light, G light and B light incoming from the reflection type light valve devices 14R, 14G and 14B so as to be directed toward the projection lens 16. The projection lens 16 emits a flux of light composed of the R light, G light and B light to project an image formed by the reflection type light valve devices 14R, 14G and 14B on the screen 21.

In short, to project an image on the screen 21 by means of the projection lens 16 signifies that the reflection type light valve devices 14R, 14G and 14B and the screen 21 are disposed at optically conjugate positions by the projection lens 16.

When such an image as described above is projected on the screen 21, a plurality of secondary light sources are formed in the proximity of the light emitting face of the second fly-eye device 5 from the first fly-eye device 4 and the second fly-eye device 5. The secondary light sources cooperate with the optical system 7 to form Koehler illumination and illuminate the reflection type light valve devices 14R, 14G and 14B.

In the existing projection type display apparatus having such a configuration as described above, in order to maximize the luminous intensity on the screen 21 on which an image is projected, positional adjustment of parts such as adjustment of the positional relationship between the light condensing mirror 1-2 and the lamp bulb 1-1, adjustment of the positional relationship between the lamp house 1 and the optical system 3 or adjustment of the inclination of the mirror 2 is performed as occasion demands. Upon such positional adjustment, a light reception sensor 22 for measuring the luminous intensity is disposed on the screen 21, and a display apparatus 23 for displaying a measurement value of the light reception sensor 22 is disposed in the proximity of the light reception sensor 22 as seen in FIG. 1.

In particular, an adjusting person would actually cause an image to be projected on the screen 21 from the existing projection type display apparatus and read the value of the luminous intensity measured thereupon by the light reception sensor 22 on the display apparatus 23 to perform positional adjustment of parts of the projection type display apparatus.

SUMMARY OF THE INVENTION

However, in order to project an image correctly on the screen 21 from the existing projection type display apparatus, the projection type display apparatus has to be spaced away from the screen 21 to a projection permitting distance at which projection from the projection lens 16 is permitted. Therefore, the existing projection type display apparatus and the light reception sensor 22 disposed on the screen 21 are naturally spaced away from each other by the projection permitting distance. Accordingly, when positional adjustment of parts of the existing projection type display apparatus is performed, a work for measuring the luminous intensity using the light reception sensor 22 spaced by the projection permitting distance is demanded. This work is cumbersome to the adjusting person.

Further, such measurement of the luminance intensity is usually performed at the center of the projection image. In particular, the light reception sensor 22 is disposed at the center of the projection image. However, in recent years, increase of the size of a screen has progressed in the field of digital cinemas and so forth, and as a result, the center of a projection image, that is, the position of the center of the screen 21, is sometimes positioned at a considerable height from the floor. In such an instance, a work of disposing the light reception sensor 22 at a central portion of the screen 21 and measuring the luminous intensity is difficult in terms of the position to the adjusting person.

Therefore, it is demanded by the adjusting person of the projection type display apparatus that positional adjustment of parts of the projection type display apparatus can be performed readily. However, such a demand as just described is not yet satisfied sufficiently.

Therefore, it is desirable to provide a projection type display apparatus wherein positional adjustment of parts can be performed readily.

According to an embodiment of the present invention, there is provided a projection type display apparatus including a color separation optical system configured to separate light from a light source into a plurality of light fluxes of different colors, a plurality of reflection type light valve devices provided individually for the color light fluxes, a plurality of polarization beam splitters each configured to polarize and separate a predetermined one of the color light fluxes separated by the color separation optical system by means of a polarization separation portion such that the predetermined color light flux is emitted to a corresponding one of the reflection type light valve devices and then polarize and separate the light coming in from the reflection type light valve device by means of the polarization separation portion, and a light reception device provided for one or more of the polarization beam splitters and configured to detect light emitted from a second face from among faces of the predetermined polarization beam splitter which is opposite to a first face to which the predetermined color light flux from the color separation optical system is introduced.

Preferably, the light reception device corresponding to the predetermined polarization beam splitter may be disposed at a position symmetrical to a corresponding one of the reflection type light valve devices with respect to an axis of symmetry provided by the polarization separation portion of the predetermined polarization beam splitter.

The light reception device may be an area sensor.

The light reception device corresponding to the predetermined polarization beam splitter may be formed from one or more pin-hole members each having a pin-hole and each disposed at an arbitrary position within a plane symmetrical to a corresponding one of the reflection type light valve devices with respect to an axis of symmetry provided by the polarization separation portion of the predetermined polarization beam splitter, and one or more light reception sensors each configured to receive a light flux passing through the pin-hole.

Preferably, the projection type display apparatus may further include a presentation apparatus for presenting detection information of the light reception device or devices each corresponding to one of the polarization beam splitters or worked information of the detection information as information regarding the light projected from the projection type display apparatus.

The projection type display apparatus may be configured such that the plural light reception devices are provided individually for the polarization beam splitters, and further include a monitoring apparatus for monitoring a performance state of an optical part which composes the projection type display apparatus based on detection information of the light reception devices.

According to another embodiment of the present invention, there is provided a method of detecting light emitted from a projection type display apparatus, including the steps of separating light from a light source into a plurality of light fluxes of different colors, polarizing and separating a predetermined one of the separated color light fluxes by means of a polarization beam splitter, and detecting light emitted from the predetermined polarizing light beam splitter in the projection type display apparatus.

With the projection type display apparatus, positional adjustment of parts is simplified.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Before a preferred embodiment of the present invention is described in detail, a corresponding relationship between several features recited in the accompanying claims and particular elements of the preferred embodiments described below is described. The description, however, is merely for the confirmation that the particular elements which support the invention as recited in the claims are disclosed in the description of the embodiments of the present invention. Accordingly, even if some particular element which is recited in description of the embodiments is not recited as one of the features in the following description, this does not signify that the particular element does not correspond to the feature. On the contrary, even if some particular element is recited as an element corresponding to one of the features, this does not signify that the element does not correspond to any other feature than the element.

Further, the following description does not signify that the prevent invention corresponding to particular elements described in the embodiments of the present invention is all described in the claims. In other words, the following description does not deny the presence of an invention which corresponds to a particular element described in the description of the embodiments of the present invention but is not recited in the claims, that is, the description does not deny the presence of an invention which may be filed for patent in a divisional patent application or may be additionally included into the present patent application as a result of later amendment to the claims.

Figure 2:
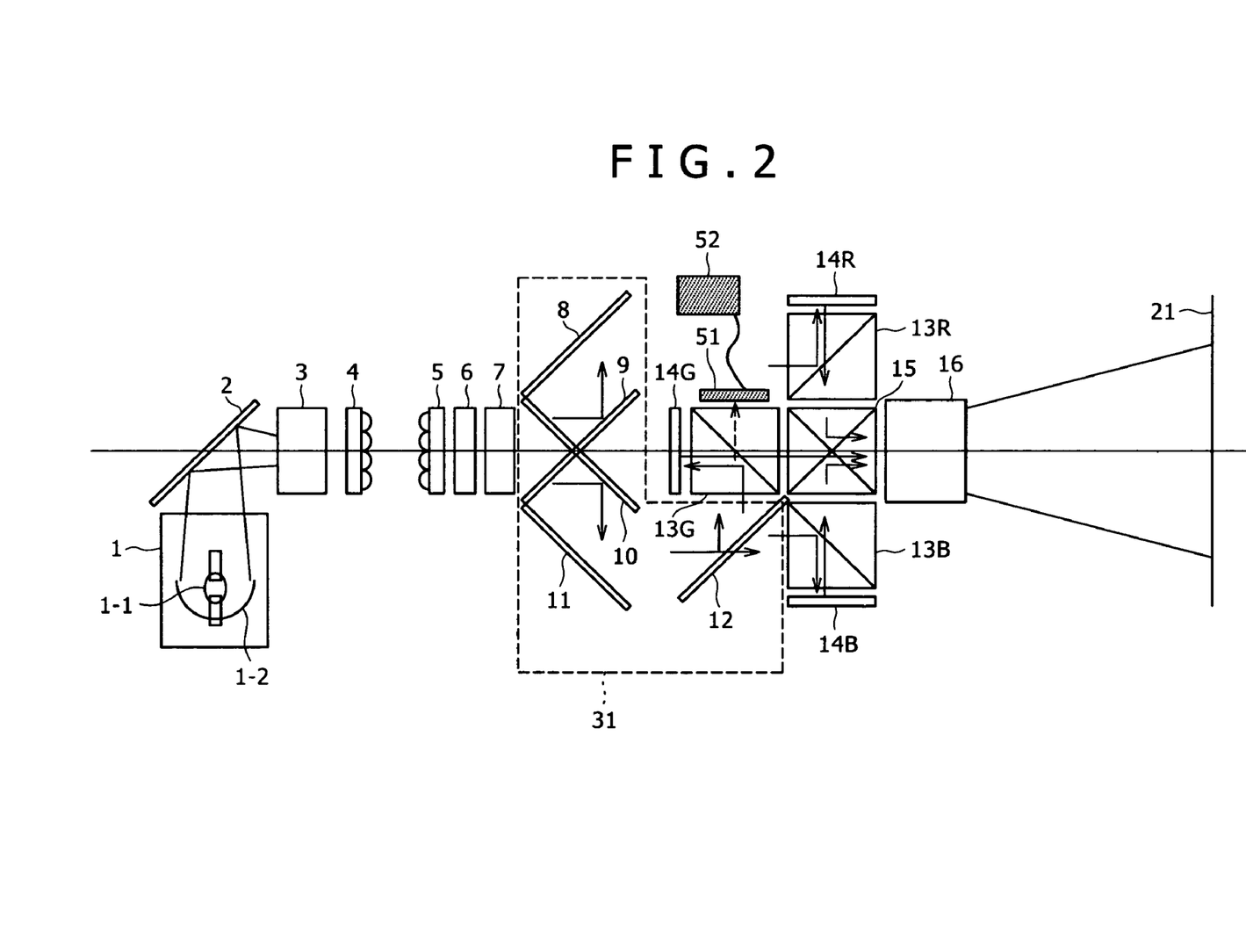
FIG. 2 is a schematic view showing an example of a general configuration of a projection type display apparatus to which the present invention is applied.
Figure 4:
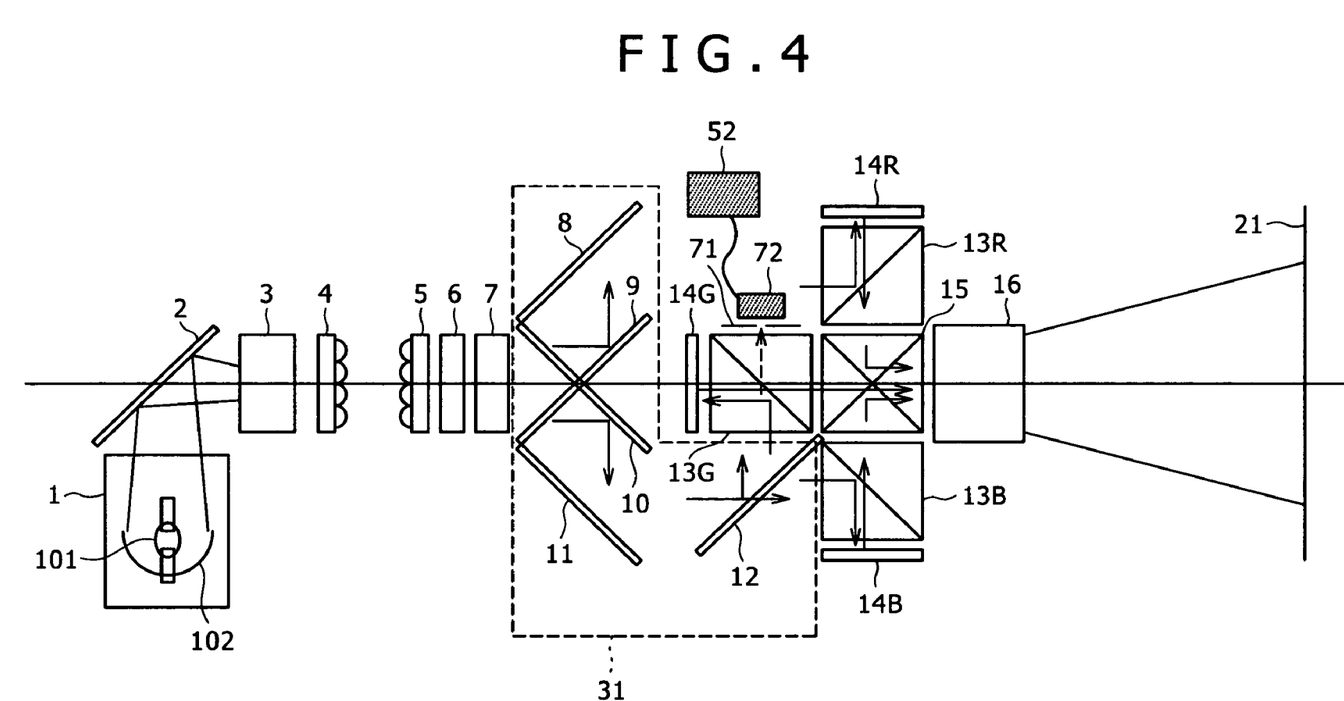
FIGS. 4, 5 and 6 are schematic views showing different examples of a general configuration of the projection type display apparatus to which the present invention is applied.
Figure 5:
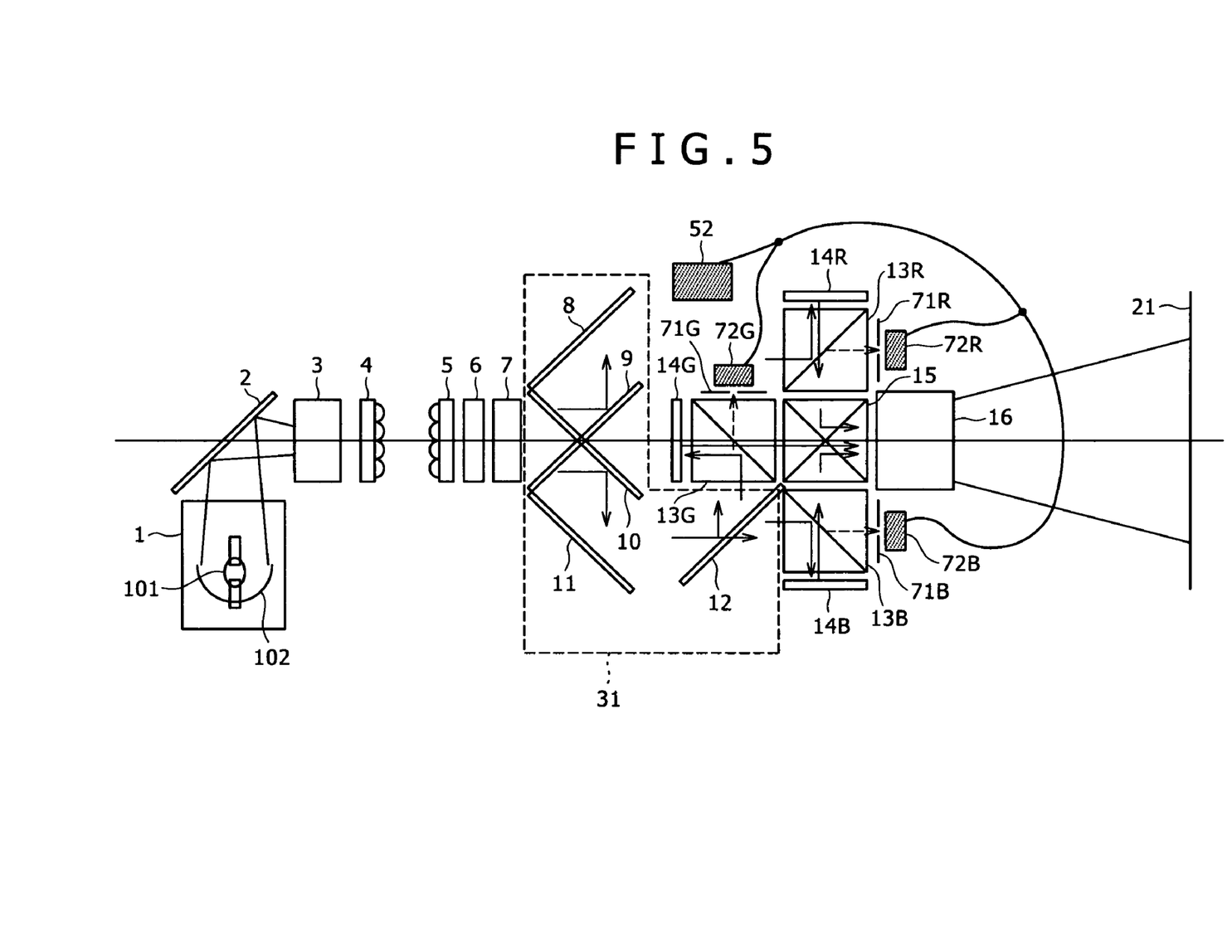
Figure 6:
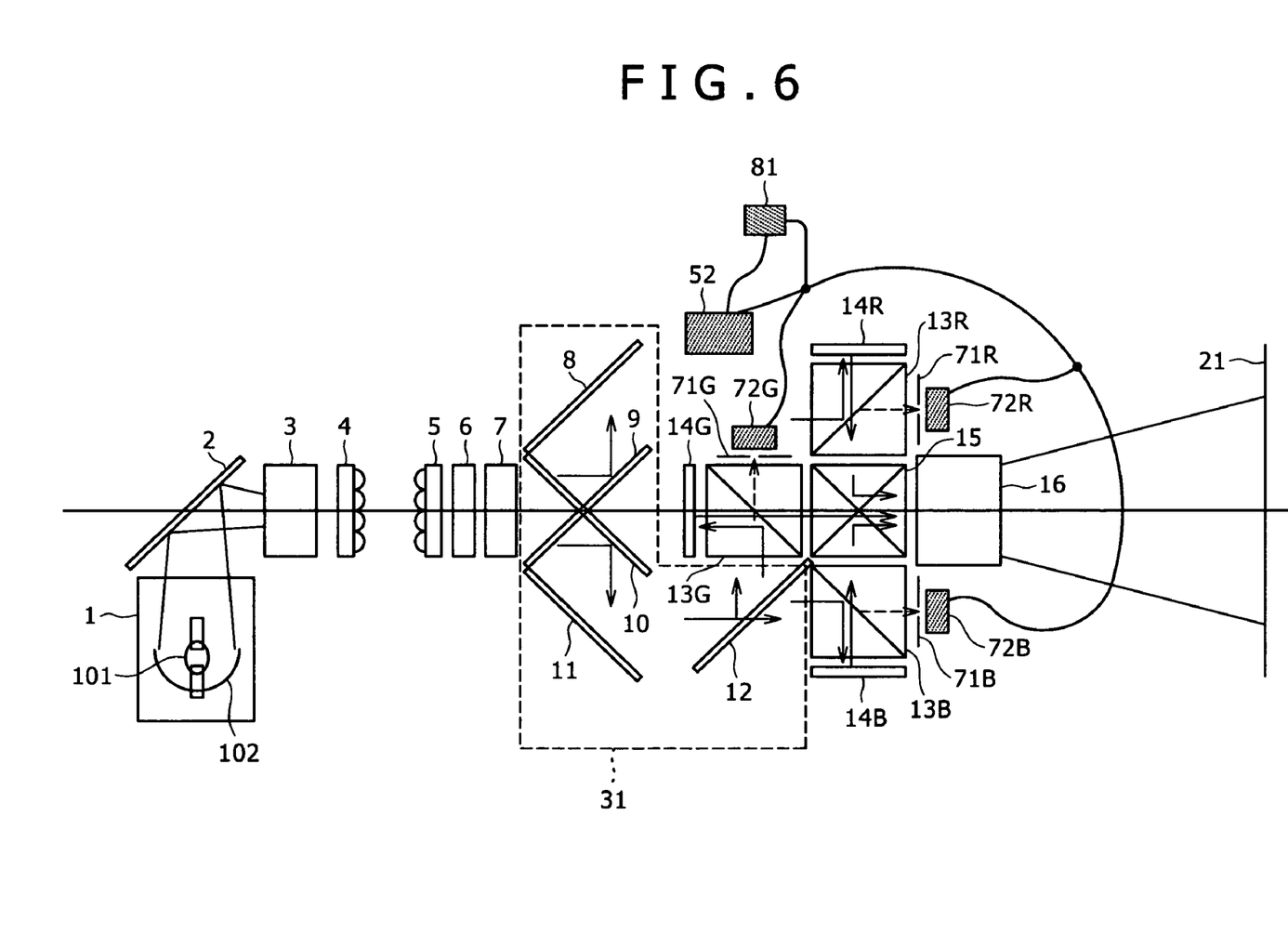

According to an embodiment of the present invention, there is provided a projection type display apparatus (for example, a projection type display apparatus of a configuration shown in FIG. 2, 4, 5 or 6; it is to be noted that, in the following description of the corresponding relationship, unless otherwise specified, only the corresponding relationship to the configuration shown in FIG. 2 is described) including a color separation optical system (for example, a color separation optical system 31 of FIG. 2) configured to separate light from a light source (for example, a lamp house 1 of FIG. 2) into a plurality of light fluxes of different colors, a plurality of reflection type light valve devices (for example, reflection type light valve devices 14R, 14G and 14B of FIG. 2) provided individually for the color light fluxes, a plurality of polarization beam splitters (for example, polarization beam splitters 13R, 13G and 13B) each configured to polarize and separate a predetermined one of the color light fluxes separated by the color separation optical system by means of a polarization separation portion (for example, a polarization separation portion 63 of FIG. 3) such that the predetermined color light flux is emitted to a corresponding one of the reflection type light valve devices and then polarize and separate the light coming in from the reflection type light valve device by means of the polarization separation portion, and a light reception device (for example, an area sensor 51 of FIG. 2) provided for one or more of the polarization beam splitters and configured to detect light emitted from a second face (for example, a face 62 of FIG. 3) from among faces of the predetermined polarization beam splitter (for example, a polarization beam splitter 13 of FIG. 3) which is opposite to a first face (for example, a face 61 of FIG. 3) to which the predetermined color light flux (for example, an incoming light flux L1 of FIG. 3) from the color separation optical system is introduced (it is to be noted that, while, in the example of FIG. 2, only a light reception device (area sensor 51) for one polarization beam splitter 13G is provided, in the examples of FIGS. 5 and 6, light reception devices (light reception sensors 72R, 72G and 72B and so forth) are provided individually for all polarization beam splitters 13R, 13G and 13B, respectively).

Figure 3:
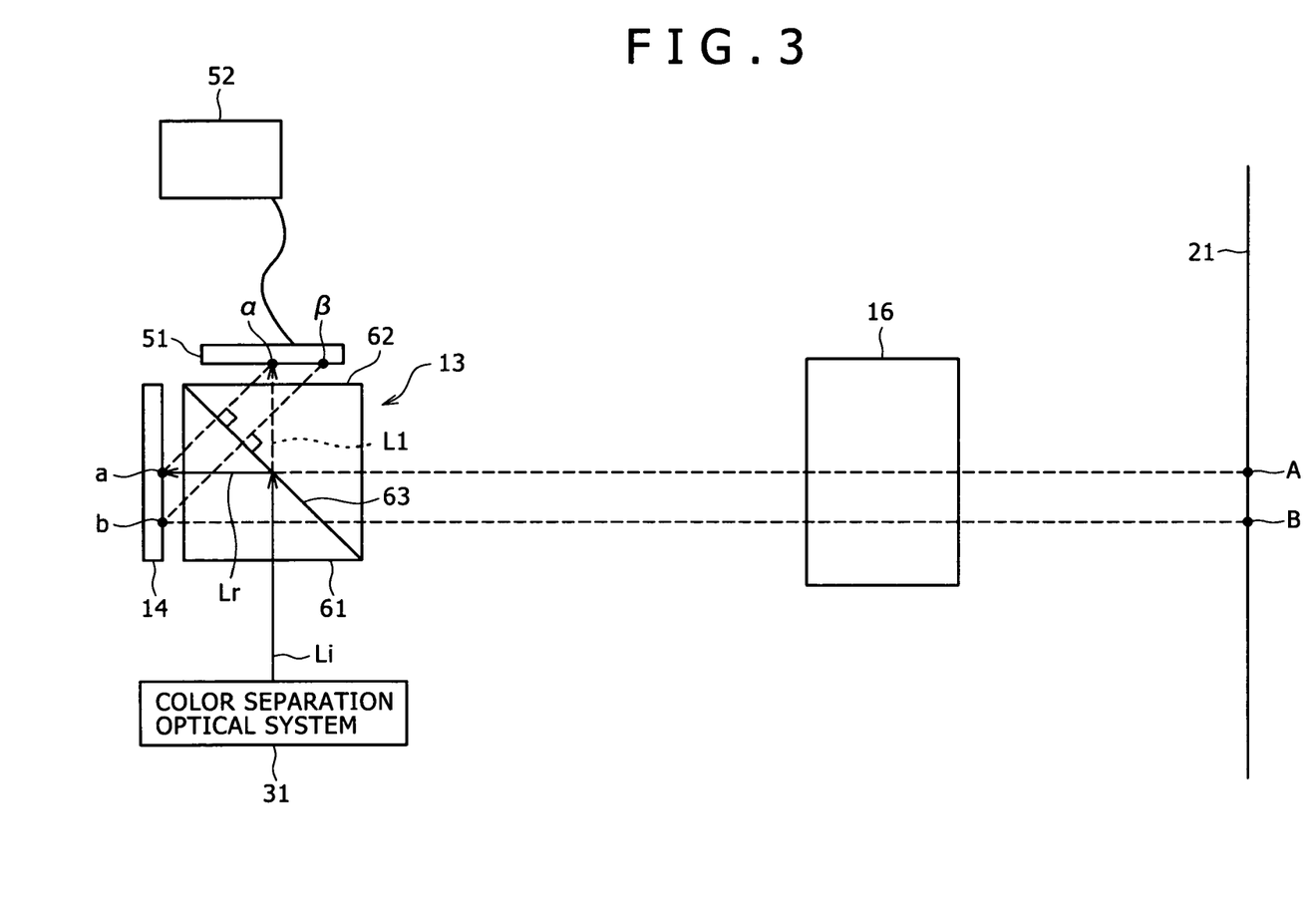
FIG. 3 is an enlarged view showing a general configuration of a polarization beam splitter and associated elements of the projection type display apparatus of FIG. 2.

The light reception device (for example, an area sensor 51 of FIG. 3) corresponding to the predetermined polarization beam splitter (for example, a polarization beam splitter 13 of FIG. 3) is disposed at a position symmetrical to a corresponding one (for example, a reflection type light valve device 14 of FIG. 3) of the reflection type light valve devices with respect to an axis of symmetry provided by the polarization separation portion (for example, a polarization separation portion 63 of FIG. 3) of the predetermined polarization beam splitter (disposed, for example, in such a manner as seen in FIG. 3).

The light reception device is an area sensor (for example, an area sensor 51 of FIGS. 2 and 3).

The light reception device (for example, a light reception device of the projection type display apparatus of FIG. 4) corresponding to the predetermined polarization beam splitter is formed from one or more pin-hole members (for example, a pin-hole member 71 of FIG. 4) each having a pin-hole and each disposed at an arbitrary position within a plane symmetrical to a corresponding one (for example, a reflection type light valve device 14G of FIG. 4) of the reflection type light valve devices with respect to an axis of symmetry provided by the polarization separation portion of the predetermined polarization beam splitter (for example, a polarization beam splitter 13G of FIG. 4, and one or more light reception sensors (for example, a light reception sensor 72 of FIG. 4) each configured to receive a light flux passing through the pin-hole.

The projection type display apparatus further includes a presentation apparatus (for example, a display apparatus 52 of FIG. 2) for presenting detection information of the light reception device or devices each corresponding to one of the polarization beam splitters or worked information of the detection information as information regarding the light projected from the projection type display apparatus.

The projection type display apparatus is configured such that the plural light reception devices (for example, light reception sensors 72R, 72G and 72B and so forth of FIG. 5 or 6) are provided individually for the polarization beam splitters (for example, all polarization beam splitters 13R, 13G and 13B in the example of FIG. 6), and further includes a monitoring apparatus (for example, a monitoring apparatus 81 of FIG. 6) for monitoring a performance state of an optical part which composes the projection type display apparatus based on detection information of the light reception devices.

In the following, several embodiments of the present invention are described with reference to the accompanying drawings.

Referring first to FIG. 2, there is shown a general configuration of a projection type display apparatus to which the present invention is applied.

The projection type display apparatus includes common components to those and has a common configuration to that of the existing projection type display apparatus described hereinabove with reference to FIG. 1, and detailed description of such common components and configuration is omitted herein to avoid redundancy.

In particular, the projection type display apparatus shown in FIG. 2 includes the components denoted by reference numerals 1 to 16 from the lamp house 1 to the projection lens 16 similarly as in the existing projection type display apparatus described hereinabove with reference to FIG. 1. Also the projection type display apparatus of the present embodiment emits a flux of light from the projection lens 16 to the screen 21 so that an image of the light flux is projected on the screen 21. In other words, a projected image is displayed on the screen 21.

The projection type display apparatus shown in FIG. 2 further includes an area sensor 51 as an exemplary one of light reception devices disposed above a polarization beam splitter 13G, and a display apparatus 52 as an exemplary one of presentation apparatus for presenting detection information of the area sensor 51.

It is to be noted that, while the area sensor 51 in FIG. 2 is disposed above the polarization beam splitter 13G, the position of the area sensor 51 is not limited to this particular position, but may be another position, such as, for example, a position rightwardly of the polarization beam splitter 13R or the polarization beam splitter 13B.

It is to be noted that, in the following description, where there is no necessity to particularly distinguish the polarization beam splitters 13R, 13G and 13B from each other, each of them is referred to merely as polarization beam splitter 13. Further, where the term polarization beam splitter 13 is used, also each of the reflection type light valve devices 14R, 14G and 14B is referred to merely as reflection type light valve device 14 without making distinction thereamong. In the following, the disposed position of the area sensor 51 is described with reference to FIG. 3 using the terms mentioned.

Referring now to FIG. 3, the area sensor 51 is disposed adjacent a face 62 of the polarization beam splitter 13 opposite to or remote from a face 61 to which a light flux Li (hereinafter referred to as incoming light flux Li) from the color separation optical system 31 is introduced.

Ideally, all of the incoming light flux Li is reflected by a polarization separation portion 63 of the polarization beam splitter 13 and received by the reflection type light valve device 14. Actually, however, part of the incoming light flux Li passes as it is through the polarization separation portion 63 without being reflected depending upon the purity of polarization light of the incoming light flux Li, that is, depending upon the ratio between desired polarization light and the other polarization light, and also upon the performance of the polarization separation portion 63. The part of the light flux, that is, the light flux which passes through the polarization separation portion 63 without being reflected, is indicated by a broken line arrow mark to which reference character Ll is applied in FIG. 3. Thus, in the following description, such a light flux as mentioned last is referred to as leakage light flux Ll.

The area sensor 51 detects a two-dimensional distribution state of the light amount of the leakage light flux Ll and outputs a result of the detection to the display apparatus 52. The display apparatus 52 displays the detection result, that is, the two-dimensional distribution state itself of the light amount of the leakage light flux Ll or/and displays worked information of the detection result.

In particular, the disposed position of the area sensor 51 may be any position at which the light amount of the leakage light flux Ll can be detected. However, preferably the disposed position of the area sensor 51 is set to a symmetrical position to the reflection type light valve device 14 with respect to an axis given by the polarization separation portion 63 of the polarization beam splitter 13 as seen in FIG. 3. The reason of the preferred arrangement is hereinafter described.

For example, where the light amount of the leakage light flux Ll from the polarization beam splitter 13G is to be detected, since the face 61 to which the G light which is the incoming light flux Li is introduced is disposed on the lower side as seen in FIG. 2 and also in FIG. 3 which corresponds to FIG. 2, the face 62 opposite to the face 61 is positioned on the upper side. As a result, the area sensor 51 is disposed above the polarization beam splitter 13G.

On the other hand, for example, where the light amount of the leakage light flux Ll from the polarization beam splitter 13R is to be detected, the face 61 to which the R light which is the incoming light flux Li is introduced is disposed on the left side as seen in FIG. 2. Consequently, the face 62 opposite to the face 61 is disposed on the right side. As a result, the area sensor 51 is disposed rightwardly of the polarization beam splitter 13R.

Similarly, for example, where the light amount of the leakage light flux Ll from the polarization beam splitter 13B is to be detected, the face 61 to which the B light which is the incoming light flux Li is introduced is disposed on the left side as seen in FIG. 2. Consequently, the face 62 opposite to the face 61 is disposed on the right side. As a result, the area sensor 51 is disposed rightwardly of the polarization beam splitter 13B.

In the following, the area sensor 51 and the display apparatus 52 are further described from the point of view of the application thereof with reference to FIG. 3.

The light amount of the leakage light flux Ll which is an object of detection of the area sensor 51 has a characteristic that it increases in proportion to the light amount of the incoming light flux Li.

Meanwhile, the polarization state of a light flux Lr (hereinafter referred to as main light flux Lr) reflected by the polarization separation portion 63 and directed toward the reflection type light valve device 14 from within the incoming light flux Li is controlled by the reflection type light valve device 14. For example, when it is tried to project the white on the screen 21, the polarization state of the main light flux Lr is controlled so that the main light flux Lr passes through the polarization separation portion 63. As a result, the main light flux Lr passes through the polarization separation portion 63 and then through the color synthesizing prism 15 (refer to FIG. 2) not shown in FIG. 3 and is emitted from the projection lens 16 toward the screen 21. In particular, the light amount of the main light flux Lr corresponds to the light amount of the light flux emerging from the projection type display apparatus of FIG. 2 and consequently to the luminous intensity on the screen 21. Also the light amount of the main light flux Lr has a characteristic that it increases in proportion to the light amount of the incoming light flux Li to the polarization beam splitter 13.

In summary, it is considered that the light amount of the leakage light flux Ll increases in proportion to the light amount of the light flux emitted from the projection type display apparatus and hence to the luminous intensity on the screen 21.

Therefore, if the constant of proportionality (gradient) between the light amount of the leakage light flux Ll and the luminous intensity on the screen 21 is grasped in advance, then the light amount of the leakage light flux Ll measured by the area sensor 51 can be used to easily determine the light amount of the light flux to be emitted from the projection type display apparatus and hence the luminous intensity on the screen 21. Then, information representative of the light amount of the leakage light flux Ll measured by the area sensor 51 or worked information of the information is displayed on the display apparatus 52.

Accordingly, where the projection type display apparatus shown in FIG. 2 is used, an adjusting person can grasp the luminous intensity on the screen 21 by visually observing the display substance of the display apparatus 52 incorporated in or located in the proximity of the projection type display apparatus. Consequently, the necessity for the actual measurement of the luminous intensity which is performed using the light reception sensor 22 (FIG. 1) disposed on the screen 21 is eliminated. As a result, positional adjustment of parts can be performed readily.

It is to be noted that, although the method of grasping the constant of proportionality (gradient) in advance is not limited particularly, for example, in the present embodiment, the following method is adopted.

In particular, while the adjusting person visually observes the detection result of the area sensor 51 displayed on the display apparatus 52, it wound first perform positional adjustment of parts (positional adjustment as initial setting) so that the light amount of the leakage light flux Ll may be maximum.

Then, the adjusting person would measure the actual measurement value of the luminous intensity on the screen 21 when the leakage light flux Ll exhibits its maximum light amount. Since the measurement method of the actual measurement value in this instance is not limited particularly, for example, the existing measurement method described hereinabove with reference to FIG. 1 or a method which uses the light reception sensor 22 disposed on the screen 21 can be adopted.

Consequently, the adjusting person can determine the constant of proportionality (gradient) from the maximum light amount of the leakage light flux Ll and the actual measurement value of the luminous intensity on the screen 21.

The coefficient of proportionality (gradient) determined in this manner may be retained by the adjusting person itself or may be retained in the inside of the projection type display apparatus (including the display apparatus 52). In the latter case, if the projection type display apparatus (including the display apparatus 52) has an arithmetic operation function, then the luminous intensity on the screen 21 can be arithmetically operated from the detection result of the area sensor 51, that is, from the light amount of the leakage light flux Ll. Also a result of the arithmetic operation can be displayed simply on the display apparatus 52. As a result, the adjusting person can perform positional adjustment of parts more simply.

Further, in the projection type display apparatus of FIG. 2, the area sensor 51 is adopted as a light reception device for detecting the light amount of the leakage light flux Ll. Therefore, the disposed position of the area sensor 51 is set to a symmetrical position to the reflection type light valve device 14 with respect to an axis provided by the polarization separation portion 63 as seen in FIG. 3. As a result, the two-dimensional distribution state of a result of the detection by the area sensor 51, that is, of the light amount of the leakage light flux Ll, substantially represents an in-plane distribution of the main light flux Lr incoming to the reflection type light valve device 14, that is, a luminous intensity distribution of an image projected on the screen 21.

In other words, the detection light amount at a point α in the two-dimensional distribution of the light amount of the leakage light flux Ll detected by the area sensor 51 corresponds to the light amount at a symmetrical point on the reflection type light valve device 14 with respect to the axis of symmetry provided by the polarization separation portion 63. This signifies that an image of the point a corresponds to the luminous intensity at a point A on the screen 21 on which an image of the point a is projected. Similarly, the detection light amount at a symmetrical point β of the two-dimensional distribution of the light amount of the leakage light flux Ll detected by the area sensor 51 corresponds to the light amount at a symmetrical point b on the reflection type light valve device 14 with respect to the axis of symmetry provided by the polarization separation portion 63. This signifies that the image of the point b corresponds to the luminous intensity at a point B on the screen 21 on which an image of the point b is projected. Although, in the example shown in FIG. 3, the positional relationship of the point a and the point b and the positional relationship of the point A and the point B are shown so as to be the same relationship (same distance) for simplified illustration, actually the two relationships are frequently different (difference in distance) depending upon the characteristic of the projection lens 16.

Further, in the example of FIG. 3, also with regard to the positional relationship between the point a and the point b on the reflection type light valve device 14, the point a is shown above the point b in FIG. 3, and also on the screen 21, the corresponding point A to the point a is displayed above the corresponding point B to the point b similarly. This is because, although the positional relationships are sometimes reversed by the reflection type light valve devices 14 for the individual colors, the color synthesizing prism 15 (not shown) and the projection lens 16, it is assumed for the simplified description that an image is projected on the screen 21 while maintaining the positional relationship on the reflection type light valve device 14.

By adopting the area sensor 51 having such a positional relationship as described above, the adjusting person can perform positional adjustment of parts from various points of view.

In particular, from the point of view where attention is paid only to the light amount, the adjusting person may arithmetically operate a representative value which is a simple average of detection light amounts of the area sensor 51 ignoring the differences of the detection light amounts which depend upon the positions on the two-dimensional distribution. On the other hand, for example, from the point of view wherein the luminous intensity balance of an image on the screen 21 in the vertical or horizontal direction of the screen, the adjusting person may arithmetically operate information, from which such a luminous intensity balance as described above can be discriminated, from the two-dimensional distribution state of the detection light amount of the area sensor 51 and perform positional adjustment of parts using the arithmetic operation value.

It is to be noted that, while such an arithmetic operation wherein a result of detection of the area sensor 51 is used in the example described above is performed by the adjusting person itself, actually the projection type display apparatus may perform the arithmetic operation if the projection type display apparatus (including the display apparatus 52) has an arithmetic operation function. In this instance, since each arithmetic operation result can be displayed simply on the display apparatus 52, the adjusting person can perform positional adjustment of parts further simply.

Further, from the point of view wherein attention is paid to the luminous intensity at a predetermined point such as, for example, the central point, on the screen 21, the adjusting person may perform positional adjustment of parts using a detection light amount at that point of the two-dimensional distribution of the light amount of the leakage light flux Ll detected by the area sensor 51 which corresponds to the predetermined point. Here, the point which corresponds to the predetermined point on the screen 21 is a point on the area sensor 51 symmetrical to a point of an image on the reflection type light valve device 14 corresponding to an image of the predetermined point on the screen 21 with respect to the axis of symmetry provided by the polarization separation portion 63. More particularly, where the predetermined point on the screen 21 is the point A, the point a corresponds to the predetermined point on the screen 21. Meanwhile, for example, where the predetermined point on the screen 21 is the point B, the point β corresponds to the predetermined point on the screen 21.

Where adjustment is performed from such a point of view as described above, that is, where the adjusting person performs positional adjustment of parts paying attention to the predetermined point on the screen 21, for example, such a projection type display apparatus as shown in FIG. 4 may be adopted in place of the projection type display apparatus shown in FIG. 2. FIG. 4 shows a general configuration of another projection type display apparatus to which the present invention is applied.

Referring first to FIG. 4, the projection type display apparatus includes common components to those and has a common configuration to that of the existing projection type display apparatus described hereinabove with reference to FIG. 1 and the projection type display apparatus described hereinabove with reference to FIG. 2. Thus, detailed description of such common components and configuration is omitted herein to avoid redundancy.

In particular, the projection type display apparatus shown in FIG. 4 includes the components denoted by reference numerals 1 to 16 from the lamp house 1 to the projection lens 16 similarly as in the projection type display apparatus described hereinabove with reference to FIG. 2. Also the projection type display apparatus of the present embodiment emits a flux of light from the projection lens 16 to the screen 21 so that an image of the light flux is projected on the screen 21. In other words, a projected image is displayed on the screen 21.

It is to be noted that the projection type display apparatus of FIG. 4 includes a light reception device disposed above the polarization beam splitter 13G and including a pin-hole member 71 having a pin-hole therein and a light reception sensor 72, and a display apparatus 52 which is an example of a presentation apparatus for presenting detection information of the light reception sensor 72. In particular, while the projection type display apparatus of FIG. 2 adopts the area sensor 51 as a light reception device, the projection type display apparatus of FIG. 4 adopts a light reception device which includes the pin-hole member 71 and the light reception sensor 72.

It is to be noted that, while the disposed position of the light reception device formed from the pin-hole member 71 and the light reception sensor 72 in FIG. 4 is set to a position above the polarization beam splitter 13G, the disposed position is not limited to that in the example of FIG. 4, but may be a position rightwardly of the polarization beam splitter 13R or of the polarization beam splitter 13B.

In other words, the disposed position of the light reception device formed from the pin-hole member 71 and the light reception sensor 72 may be any position at which the light amount of the leakage light flux Ll can be detected quite similarly to the disposed position of the area sensor 51 described hereinabove with reference to FIG. 3.

It is to be noted, however, that, where it is intended to determine the luminance intensity at a predetermined point on the screen 21, it is necessary for the light reception sensor 72 to detect the light amount of the leakage light flux Ll regarding a point on the screen 21 corresponding to the predetermined point. Further, there is the possibility that the predetermined point may be selected arbitrarily from within the overall range of the screen 21 over which an image is projected. Accordingly, where they are taken into a consideration, the position of the pin-hole member 71 is preferably set to an arbitrary position within a plane symmetrical to the reflection type light valve device 14 with respect to the axis of symmetry provided by the polarization separation portion 63 of the polarization beam splitter 13. In other words, the arbitrary position signifies a position which corresponds to the predetermined point which may be selected arbitrarily. Then, the disposed position of the mirror 2 is preferably set to a position at which the light amount of the leakage light flux Ll passing to the light reception sensor 72 through the pin-hole member 71 can be detected.

It is to be noted that, while a single set of the pin-hole member 71 and the light reception sensor 72 is provided in the example described above, where it is taken into consideration that positional adjustment of parts may possibly be performed making use of the luminous intensity at a plurality of points on the screen 21, that is, where it is taken into consideration that a plurality of points on the screen 21 may be selected as the predetermined point, a plurality of sets of the pin-hole member 71 and the light reception sensor 72 may be provided. In other words, while the light reception device in the example of FIG. 4 is formed from a single set of the pin-hole member 71 and the light reception sensor 72, actually the projection type display apparatus includes more than one set of the pin-hole member 71 and the light reception sensor 72.

In particular, for example, if the predetermined point on the screen 21 is set to five points including a position at the central point of a projected image and four positions above, below and leftwardly and rightwardly of the central point, then five pin-hole members 71 may be provided at five points on a plane symmetrical to the reflection type light valve device 14 with respect to the axis of symmetry provided by the polarization separation portion 63 of the polarization beam splitter 13, and five corresponding light reception sensors 72 may be provided. In this instance, also it is possible to obtain general information of the luminous intensity distribution of an image projected on the screen 21 from a result of the detection of the five light reception sensors 72. Thus, also it is possible for the adjusting person to use the information to perform positional adjustment of parts.

It is to be noted that, in the following description, unless otherwise specified, also where a plurality of sets of the pin-hole member 71 and the light reception sensor 72 are involved, only a pin-hole member 71 and a light reception sensor 72 are referred to for the simplified description.

In the description above, the light reception device to which the present invention is applied is a light reception device which includes the area sensor 51 in the projection type display apparatus of FIG. 2 or the pin-hole member 71 and the light reception sensor 72 of the projection type display apparatus of FIG. 4. However, the light reception device to which the present invention is applied is not limited to such specific light reception devices but may be such a light reception device as described below. In particular, if description is given with reference to FIG. 3, it is only necessary for the light reception device to be provided on that face 62 side from among the faces of the polarization beam splitter 13 which is opposite to the face 61 by which the incoming light flux Li from the color separation optical system 31 is received and detect light from the polarization beam splitter 13, that is, the leakage light flux Ll. However, the configuration of the light reception device is not limited particularly.

Further, the number of such light reception devices is not limited to one but may be a plural number. In particular, one light reception device may be provided for one polarization beam splitter 13 (refer to FIG. 2 or 4), or a plurality of light reception devices may be provided individually for a plurality of polarization beam splitters 13.

In particular, for example, in an example of FIG. 5, a light reception device formed from a pin-hole member 71G and a light reception sensor 72G is disposed above the polarization beam splitter 13G, and another light reception device formed from a pin-hole member 71R and a light reception sensor 72R is disposed rightwardly of the polarization beam splitter 13R while a further light reception device formed from a pin-hole member 71B and a light reception sensor 72B is disposed rightwardly of the polarization beam splitter 13B. In this instance, detection information of the light reception sensors 72R, 72G and 72B or worked information of the detection information can be displayed on the display apparatus 52.

In particular, FIG. 5 shows a general configuration of a further projection type display apparatus to which the present invention is applied. Referring to FIG. 5, the projection type display apparatus includes common components to those and has a common configuration to that of the existing projection type display apparatus described hereinabove with reference to FIG. 1 and the projection type display apparatus described hereinabove with reference to FIGS. 2 and 4. Thus, detailed description of such common components and configuration is omitted herein to avoid redundancy.

Where the projection type display apparatus of FIG. 5 is adopted, in addition to the effect described above (hereinafter referred to as adjustment facilitation effect) that adjustment of parts can be performed readily, another effect (hereinafter referred to as deterioration grasping effect) that a deterioration state of each part can be grasped can be exhibited.

In the following, such a deterioration grasping effect as just mentioned is described more particularly.

In particular, an optical part from among various parts which compose a projection type display apparatus is exposed to thermal load generated principally by conversion of light into heat. Accordingly, an optical part has a characteristic that it is deteriorated by thermal load. Particularly since a projection type display apparatus has come to be applied in the field of digital cinemas or the like in recent years, it has become necessary to project an image on a large-size screen, and the light amount for such projection increases year by year. Together with this, also the amount of heat applied to optical parts increases and has an influence on the life of the optical parts.

Generally, although it is recommended to exchange an optical part in accordance with a period of time set in advance (estimated life), actually the degree at which the life is reached or the degree of deterioration in performance by thermal load depends upon the situation of use by a user. Therefore, the timing at which an optical part is to be exchanged need be decided individually. Accordingly, while it is a demand of a user to appropriately perform life diagnosis of an optical part of a projection type display apparatus, such a demand is not satisfied sufficiently.

However, if the projection type display apparatus of FIG. 5 is utilized, for example, in such a manner as described below, then the deterioration grasping effect can be exhibited, and consequently, the demand described can be satisfied.

In particular, the user would retain ratios (hereinafter referred to as initial output ratios) of outputs of the light reception sensors 72R, 72G and 72B at an initial stage of use of the projection type display apparatus of FIG. 5. Then, the user would compare ratios (hereinafter referred to as current output ratios) of outputs of the light reception sensors 72R, 72G and 72B when the projection type display apparatus is used later with the initial output ratios. Consequently, the deterioration state of various parts on the paths up to the polarization beam splitters 13R, 13G and 13B can be individually grasped for the individual parts for the R light, G light and B light based on a result of the comparison. For example, the user can make such a decision readily that, although the current output ratio of the B light and the G light is substantially equal to the initial output ratio, since the current output ratios of the R light and the other lights exhibit variation from the initial output ratios, if a drop only of the output of the R light is discriminated, then the parts in the light path of the R light suffer from performance deterioration.

It is to be noted that such initial output ratios and current output ratios may be retained by the user itself or may be retained in the projection type display apparatus (including the display apparatus 52) of FIG. 5. Or, for example, the initial output ratios and current output ratios may be stored into a monitoring apparatus 81 incorporated in the projection type display apparatus as seen in FIG. 6 and having an arithmetic operation function.

Referring to FIG. 6, there is shown a still further projection type display apparatus to which the present invention is applied. The projection type display apparatus includes common components to those and has a common configuration to that of the existing projection type display apparatus described hereinabove with reference to FIG. 1 and the projection type display apparatus described hereinabove with reference to FIGS. 2, 4 and 5. Thus, detailed description of such common components and configuration is omitted herein to avoid redundancy.

Referring to FIG. 6, the monitoring apparatus 81 can acquire outputs of the light reception sensors 72R, 72G and 72B and arithmetically operate and store initial output ratios and/or current output ratios. Further, the monitoring apparatus 81 may perform comparison arithmetic operation between the initial output ratios and the current output ratios and perform light diagnosis arithmetic operation or the like based on a result of the comparison arithmetic operation. Then, a result of the life diagnosis arithmetic operation can be displayed on the display apparatus 52. Consequently, the user can perform the life diagnosis operation of the parts further simply.

It is to be noted that, while, in the projection type display apparatus of FIG. 6, the monitoring apparatus 81 is provided separately from the display apparatus 52 in order to clearly indicate the function of life diagnosis, the function of the monitoring apparatus 81 may be assigned to the display apparatus 52 or some other part not shown as described hereinabove. In this instance, the monitoring apparatus 81 can be omitted.

Further, in order for such a deterioration grasping effect as described above to be exhibited, there is no necessity to configure the projection type display apparatus in such a manner as in the projection type display apparatus shown in FIG. 5 or 6. In particular, such a configuration that a light reception device to which the present invention is applied is disposed individually in the polarization beam splitters 13R, 13G and 13B, for example, the area sensor 51 of FIG. 2 is disposed individually in the polarization beam splitters 13R, 13G and 13B, may be adopted.

While the projection type display apparatus shown in FIGS. 2, 4, 5 and 6 are described as the projection type display apparatus according to the embodiments of the present invention, the present invention is not limited to the specific projection type display apparatus but may be embodied in various manners.

For example, while, in the projection type display apparatus described hereinabove with reference to FIGS. 2, 4, 5 and 6, the display apparatus 52 is a component, particularly this is not essentially required as a component of the projection type display apparatus. In other words, it is only necessary for the projection type display apparatus to which the present invention is applied to include more than one light reception device described hereinabove to which the present invention is applied and have a function of outputting a result of the detection of the light reception devices. Further, also the presentation apparatus for presenting a result of detection by the light reception devices is not particularly limited to the display apparatus 52, but any other presentation apparatus such as a sound outputting apparatus which outputs a message or the like may be used. In other words, the presentation method for a detection result of the light reception devices is not limited particularly and may be, for example, display or sound outputting. Or, the detection result itself of the light reception device may be presented, or worked information of the detection result may be presented.

It should be understood by those skilled in the art that various modifications, combinations, sub-combinations and alterations may occur depending on design requirements and other factor in so far as they are within the scope of the appended claims or the equivalents thereof.

The invention claimed is:

1. A projection type display apparatus, comprising:
   a color separation optical system configured to separate light from a light source into a plurality of light fluxes of different colors;
   a plurality of reflection type light valve devices provided individually for the color light fluxes;
   a plurality of polarization beam splitters each configured to polarize and separate a predetermined one of the color light fluxes separated by said color separation optical system by means of a polarization separation portion such that the predetermined color light flux is emitted to a corresponding one of said reflection type light valve devices and then polarize and separate the light coming in from the reflection type light valve device by means of said polarization separation portion; and
   a light reception device provided for one or more of said polarization beam splitters and configured to detect light emitted from a second face from among faces of the predetermined polarization beam splitter which is opposite to a first face to which the predetermined color light flux from said color separation optical system is introduced.

2. The projection type display apparatus according to claim 1, wherein said light reception device corresponding to the predetermined polarization beam splitter is disposed at a position symmetrical to a corresponding one of said reflection type light valve devices with respect to an axis of symmetry provided by said polarization separation portion of the predetermined polarization beam splitter.

3. The projection type display apparatus according to claim 1, wherein said light reception device is an area sensor.

4. The projection type display apparatus according to claim 1, wherein said light reception device corresponding to the predetermined polarization beam splitter is formed from:
   one or more pin-hole members each having a pin-hole and each disposed at an arbitrary position within a plane symmetrical to a corresponding one of said reflection type light valve devices with respect to an axis of symmetry provided by said polarization separation portion of the predetermined polarization beam splitter; and
   one or more light reception sensors each configured to receive a light flux passing through said pin-hole.

5. The projection type display apparatus according to claim 1, further comprising a presentation apparatus for presenting detection information of the light reception device or devices each corresponding to one of said polarization beam splitters or worked information of the detection information as information regarding the light projected from said projection type display apparatus.

6. The projection type display apparatus according to claim 1, wherein the plural light reception devices are provided individually for said polarization beam splitters, and said projection type display apparatus further comprises a monitoring apparatus for monitoring a performance state of an optical part which composes said projection type display apparatus based on detection information of said light reception devices.

7. A method of detecting light emitted from a projection type display apparatus, comprising the steps of:
   separating light from a light source into a plurality of light fluxes of different colors by use of a color separation optical system;
   polarizing and separating a predetermined one of the separated color light fluxes by means of a polarization beam splitter; and
   detecting light emitted from a second face from among a plurality of faces of the predetermined polarizing light beam splitter in the projection type display apparatus, in which the second face is opposite to a first face of the predetermined polarizing light beam splitter to which the predetermined color light flux from said color separation optical system is introduced.

* * * * *